United States Patent [19]

King et al.

[11] 4,222,540
[45] Sep. 16, 1980

[54] TUBE SHEET PAN AND TILT CAMERA PLATFORM

[75] Inventors: William E. King, McCandless Township, Allegheny County, Pa.; Gregory L. Calhoun, Lutz, Fla.

[73] Assignee: Westinghouse Electric Corp., Pittsburgh, Pa.

[21] Appl. No.: 965,557

[22] Filed: Dec. 1, 1978

[51] Int. Cl.$^2$ .................. A47B 96/06; F16M 11/02
[52] U.S. Cl. ........................ 248/205 R; 248/179; 248/662; 352/243; 354/81
[58] Field of Search ............... 248/205 R, 177, 178, 248/183, 179, 652, 662, 666, 667, 278, 279, 324; 352/243; 354/81

[56] References Cited

U.S. PATENT DOCUMENTS

| 2,551,180 | 5/1951 | Starr et al. ...................... 248/183 X |
| 2,625,074 | 1/1953 | Nistri ................................ 248/662 X |
| 2,802,094 | 8/1957 | Grosz ............................... 248/279 X |
| 3,044,346 | 7/1962 | Fieux ................................ 352/243 |
| 3,561,343 | 2/1971 | Plummer ......................... 354/81 |
| 3,776,494 | 12/1973 | Baucheron .................... 354/81 X |
| 3,891,301 | 6/1975 | Heller ............................. 354/81 X |
| 4,044,364 | 8/1977 | Prinzo ............................ 352/243 X |
| 4,118,720 | 10/1978 | Gottschalk ..................... 354/81 |
| 4,158,489 | 6/1979 | Gottschalk ..................... 248/179 |

FOREIGN PATENT DOCUMENTS

| 2241848 | 3/1975 | France ............................ 248/179 |
| 409474 | 5/1934 | United Kingdom ........... 248/205 R |

*Primary Examiner*—J. Franklin Foss
*Attorney, Agent, or Firm*—F. J. Baehr, Jr.

[57] ABSTRACT

Apparatus which can be remotely mounted in a tube in a tube sheet provides a platform for mounting a camera. The platform rotates about a shaft extending from the tube, tilts, and moves axially along the shaft to allow the camera to pan the entire tube sheet and equipment utilized to work thereon.

8 Claims, 7 Drawing Figures

TUBE SHEET PAN AND TILT CAMERA PLATFORM

BACKGROUND OF THE INVENTION

This invention relates to apparatus for remotely inspecting and repairing nuclear steam generators and more particularly to apparatus for mounting a camera for inspecting the tube sheet, and monitoring manual and remote operations being performed in the channel head of the steam generator.

In pressurized water nuclear reactives, primary fluid or coolant is pumped in a closed loop through a reactor vessel and through a steam generator. Radioactive contaminants in the primary fluid are deposited on the tubes and in the channel head of the steam generator so that repair crews are subjected to significant levels of radioactivity when working therein. Therefore, in order to reduce the exposure of personnel to radiation, remotely operated equipment is being developed. Such equipment requires cameras that can be remotely mounted and remotely operated.

SUMMARY OF THE INVENTION

In general, apparatus for holding the camera adjacent a tube sheet having a plurality of tubes disposed therein and for providing pan and tilting movement of the camera, when made in accordance with this invention, comprises a base, a sleeve rotatably disposed in the base and having internal threads, a threaded shaft threadedly engaging the sleeve and a drive for rotating the sleeve to move the base up and down the shaft. The apparatus also comprises a bracket disposed on the base, a camera platform pivotly mounted on the bracket and a drive for pivoting the platform with respect to the bracket. A pin insertable in a tube and incorporating a device for expanding the pin in holding engagement with the tube to hold the apparatus in the tube and a device for rotating the platform to provide panning of the camera, is also incorporated in the apparatus.

BRIEF DESCRIPTION OF THE DRAWINGS

The objects and advantages of this invention will become more apparent from reading the following detailed description of the drawings, in which.

DESCRIPTION OF THE PREFERRED EMBODIMENT

Figure 1:
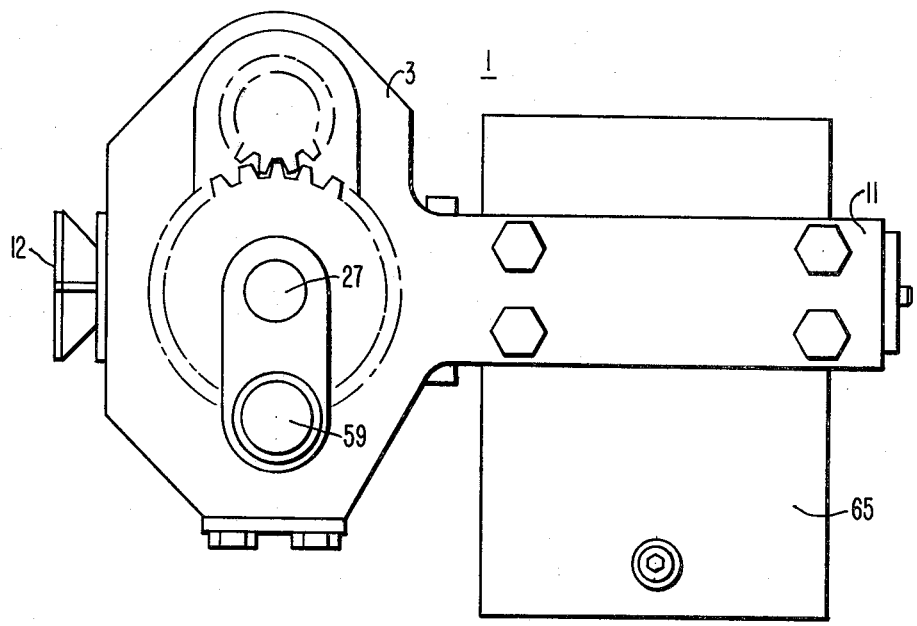
FIG. 1 is a plan view of a camera platform made in accordance with this invention.

Referring now to the drawings in detail, there is shown camera mounting apparatus 1, which attaches itself to a tube T disposed in a tube sheet TS and pans a camera 2 across the tube sheet and tilts the camera 2.

The apparatus 1 is utilized with a remote access manipulator such as that described in an earlier application filed by the assignee on Jan. 9, 1978 and assigned Ser. No. 868,001, which application is herein incorporated by reference.

The apparatus 1 comprises a base 3 having a first bore 5 in which a sleeve 7 is rotatably mounted, a second bore 9 and an arm 11 which extends outwardly from one side of the base 3. The base 3 also has a dove-tail, truncated diamond, or other means 12 disposed on one side thereof to provide a quick disconnect to attach the apparatus 1 to some type of remotely operated arm such as a slave manipulator described in detail in the application incorporated hereinbefore by reference.

Figure 5:
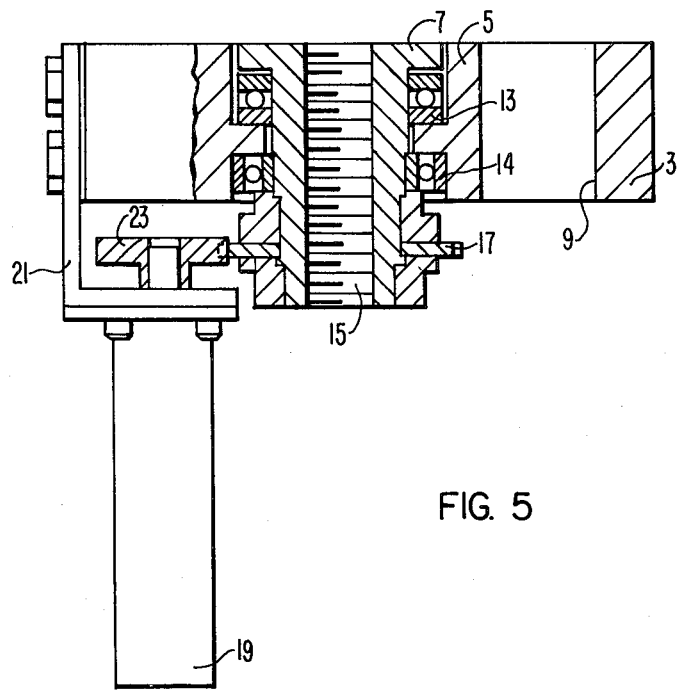
FIG. 5 is an elevational view, partially in section, of the base.

As shown best in FIG. 5, the first bore 5 is counterbored from both sides to receive a thrust bearing 13 and radial bearing 14 upon which the sleeve 7 is rotatably mounted. The sleeve 7 has an internal thread 15 and a spur gear 17 or other drive means affixed adjacent one end thereof. An electric motor 19 or other drive means is mounted on an angular bracket 21 which is attached to the base 3. The motor 19 has a spur gear 23 or other drive means which engages the spur gear 17 to provide means for rotating the sleeve 7.

A threaded shaft 25 is disposed in threaded engagement with the sleeve 7 and moves axially as the sleeve 7 is rotated, the direction of axial movement being determined by the direction in which the sleeve 7 turns.

Figure 6:
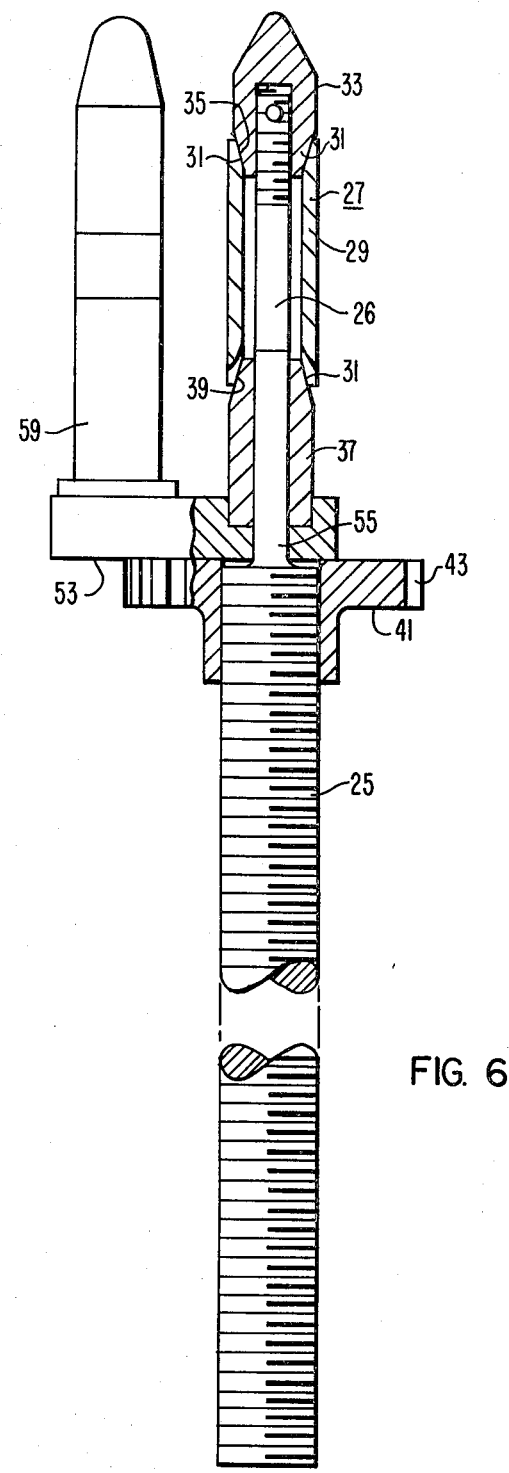
FIG. 6 is an elevational view, partially in section, of the shaft.

As shown best in FIG. 6, the threaded shaft 25 has one end or portion 26 turned down. A pin 27 is disposed on the turned-down end 26 of the shaft 25. The pin 27 has a central-cylindrical portion 29 with tapered counterboards 31 on each end and a plurality of kerfs 32 extending inwardly from the end thereof. A bullet-shaped nose 33 with a tapered trailing end 35 is affixed to the distal end of the turned-down portion 26 of the shaft 25. A sleeve portion 37 slides over the turned-down portion 26 of the shaft 25 adjacent the shoulder. The sleeve portion 37 has an external taper 39 on one end thereof. The tapers 35 and 39 on the nose 33 and sleeve 37, respectively, engage the tapered counterbores 31 of the cylindrical portion 29 to expand the cylindrical portion 29 into holding engagement with a tube when the nose 33 and sleeve portion 37 are biased toward each other. A flanged nut 41 with a spur gear 43 disposed on the outer periphery of the flange is threaded on the shaft 25 adjacent the pin 27 and when rotated in one direction applies the biasing force needed to urge the nose 33 and sleeve portion 37 of the pin toward each other to cause the pin 27 to expand outwardly into holding engagement with the tubes. Rotating the nut in the opposite direction disengages the pin 27 from the tube T.

Figure 2:
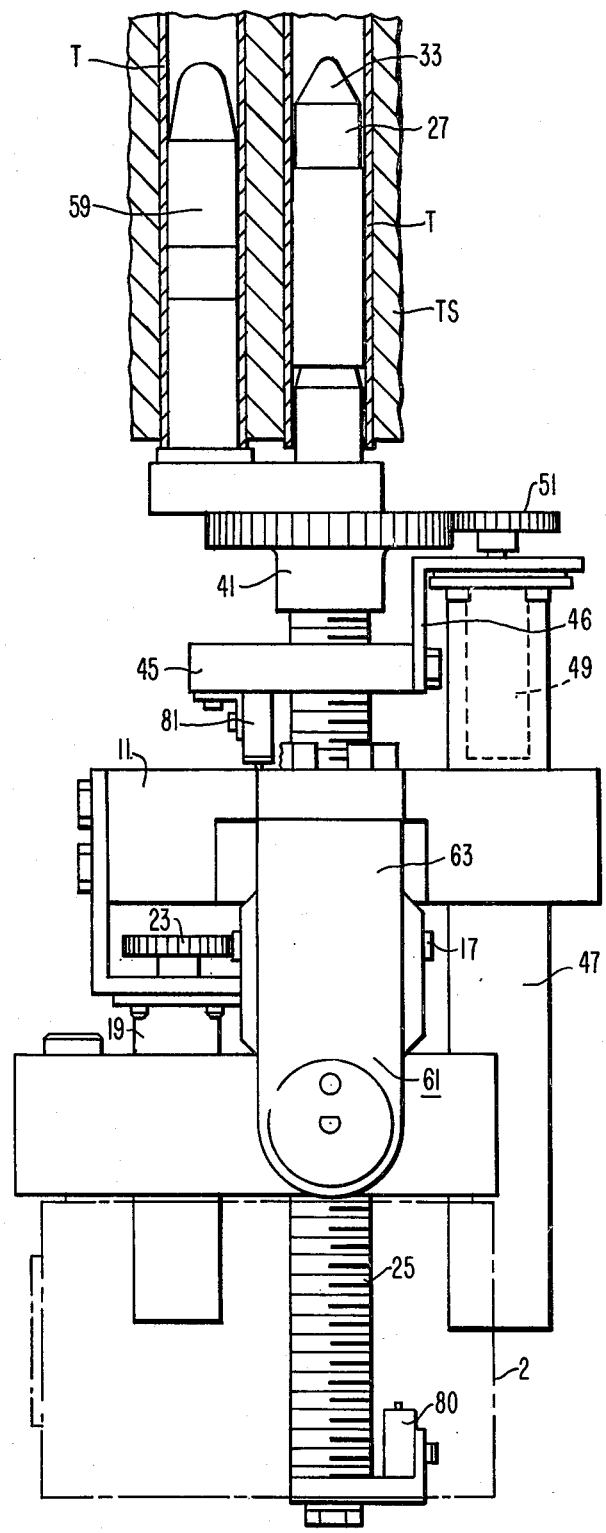
FIG. 2 is an elevational view of the camera platform.

As shown best in FIG. 2, a collar 45 is affixed to the threaded shaft 25 adjacent the nut 41 and a mounting bracket 46 extends from one side thereof. A second shaft 47 is affixed to the mounting bracket 46 and has a motor 49 disposed therein. The motor 49 has a spur gear 51 or other drive means attached thereto. The spur gear 51 engages the spur gear 43 on the nut 41 to rotate the nut 41. The second shaft 47 slidably engages the second bore 9 in the base 3.

As shown in FIG. 6, an arm 53 has a hole 55 through which the turned-down portion 26 of the threaded shaft 25 freely slides and is attached to the sleeve portion 37 of the pin 27 by welding or other means. A second pin 59 slightly smaller in diameter than the inside diameter of a tube is disposed on the arm 53 extending generally parallel to the first pin 27.

Figure 4:
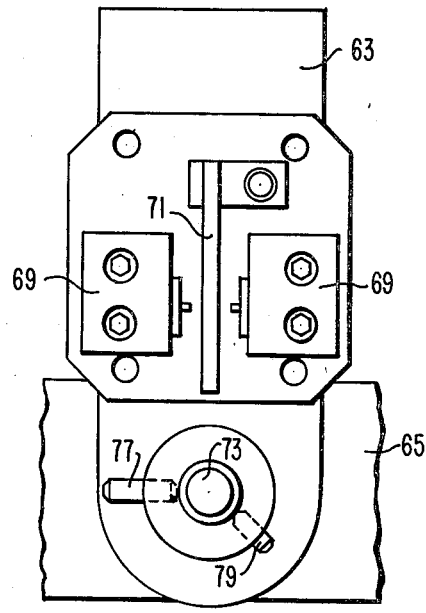
FIG. 4 is a sectional view taken on line IV—IV of FIG. 3.
Figure 3:
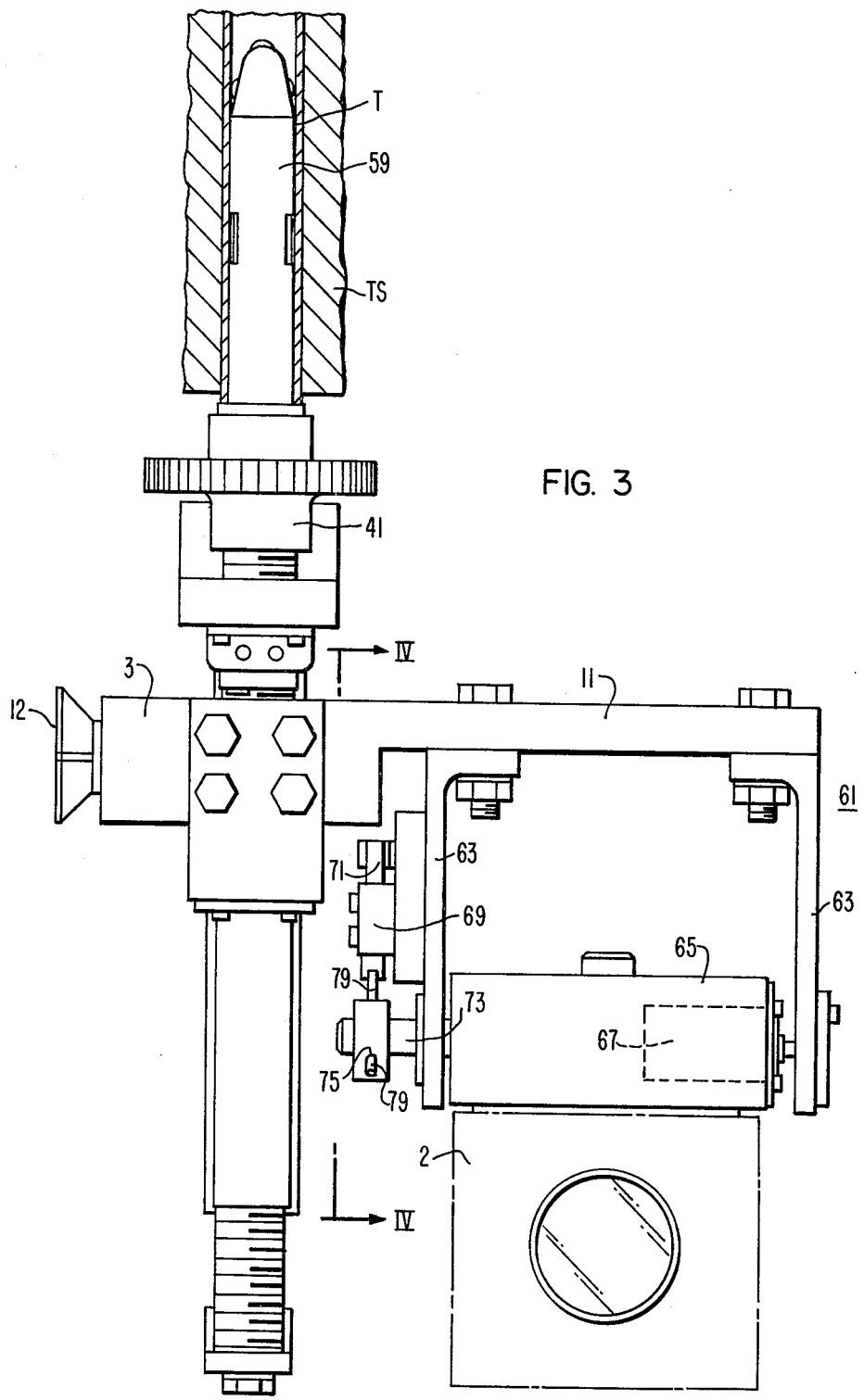
FIG. 3 is another elevational view of the camera platform.

As shown in FIGS. 3 and 4, depending from the arm 11 of the base 3 is a bracket 61 formed from a pair of angular members 63. Pivotally disposed between the angular members 63 is a platform 65 on which the camera 2 mounts. An electric motor 67 or other drive means is disposed within the platform 65 providing the pivoting movement to tilt the platform 65. Disposed on one of the angular members 63 are a pair of micro-switches 69 with a leaf spring 71 disposed therebetween. A pivotal pin 73 is affixed to the camera platform 65 and pivotally extends through one of the angular members 63. A collar 75 is affixed to the distal end of the pivotal pin 73 and pegs 77 and 79 are disposed radially on the collar and extend to contact the leaf spring as the camera platform 65 is pivoted. The leaf spring 71 contacts the appropriate micro-switches 69 to limit the angular movement of the platform as it pivots to tilt the camera 2.

Micro-switches 80 and 81 are disposed on opposite ends of the threaded shaft 25 to limit the movement of the base 3 axially along the shaft 25 as the platform 65 is lowered and raised along the shaft.

Figure 7:
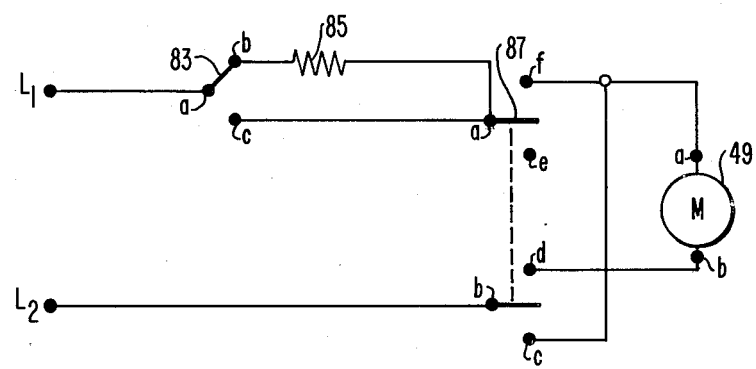
FIG. 7 is a schematic diagram of a control circuit of a motor which locks the camera platform in a tube and pans the camera.

FIG. 7 shows a current limiting circuit for operating the motor 49 which has a and b terminals. The circuit is connected to appropriate DC power sources at $L_1$ and $L_2$ and comprises a single-pole single-throw switch 83 having a, b, and c contacts, a resistor or other current limiting means 85 and a double-pole double-throw center off momentary switch 87 having a, b, c, d, e, and f contacts. As represented in the circuit diagram, $L_1$ is electrically connected to the a terminal of the switch 83, the c terminal of the switch 83 is electrically connected to the a terminal of the switch 87, and the resistor 85 is electrically connected to the b terminal of the switch 83 and to the a terminal of the switch 87. $L_2$ is electrically connected to the b terminal of the switch 87. Terminals c and f of the switch 87 are electrically connected to the a terminal of the motor 49 while the e and d terminals of switch 87 are electrically connected to the b terminal of the motor 49.

Operation of the apparatus 1 is as follows:

The truncated diamond 12 on the base 3 is attached to an arm of a remotely operated device such as the slave manipulator described in the application hereinbefore incorporated by reference and the pins 27 and 59 are inserted in the appropriate tubes T by this device. Once the pins are inserted in the tubes T, the single-pole switch 83 is operated to provide electrical contact between the terminal a and c and the momentary switch 87 is operated to provide contact between the terminals a and f and b and d causing the motor 49 to rotate and produce its maximum torque. The motor 49 transmits torque to the flange nut 41 through the gears 43 and 51 to pull the nose 33 toward the sleeve portion 37 resulting in the cylindrical portion 29 expanding outwardly to engage the tubes and hold the apparatus 1 therein. The arm of the slave manipulator is then removed from the truncated diamond 12.

The switch 87 is released and allowed to return to its center-off position. The switch 83 is operated to connect the a and b terminals placing the load limiting resistance 85 in the circuit. Operating the switch 87 now runs the motor 49 at a limited current and limited torque causing the base 3, platform 65, motor mount 45, and camera 2 to rotate about the threaded shaft 25 in the appropriate direction to pan the tube sheet. Operation of the motor 19 rotates the sleeve 7 to move the base 3 axially along the shaft 25. The limit switches 80 and 81 limit the axial movement of the base 3 along the shaft 25. The motor 67 tilts the platform 65 tilting the camera 2, thus providing a self-supporting camera base which will pan, tilt, and move the camera 2 up and down with respect to the tube sheet TS.

What is claimed is:

1. Apparatus for holding a camera adjacent a tube sheet having a plurality of tubes disposed therein, said apparatus providing pan and tilt movement for the camera and comprising:

a base, a sleeve rotatably disposed in said base and having internal threads, a threaded shaft disposed in threaded engagement with said sleeve, means for rotating said sleeve to move said base up and down said shaft, a bracket disposed on said base, a camera platform pivotally disposed on said bracket, means for pivoting said platform with respect to said bracket, a pin disposed on one end of said shaft, insertable in a tube and having means incorporated therein for expandingly engaging said tube, a nut disposed on said threaded shaft and cooperatively associated with said pin so that when rotated in one direction, it will expand said pin into engagement with said tube and when rotated in the opposite direction will cause said pin to disengage said tube, and means for rotating said nut and for rotating said platform whereby a camera disposed on said camera platform may pan the tube sheet.

2. Apparatus as set forth in claim 1, wherein the means for rotating said nut and for rotating said platform comprises a motor and a torque limiting circuit associated therewith to limit the torque produced by the motor during the platform rotating mode of operation where the motor will not develope enough torque to turn the nut with respect to the threaded shaft and thereby cause disengagement of the pin and the tube.

3. Apparatus as set forth in claim 1 and further comprising a second pin fixed in a spaced relationship with the first-mentioned pin, the second pin slidably fitting into a tube.

4. Apparatus as set forth in claim 1 and further comprising a collar affixed to the threaded shaft and a second shaft affixed to the collar and slidably disposed in the base.

5. Apparatus as set forth in claim 4, wherein the means for rotating the nut and the platform are cooperatively associated with the second shaft.

6. Apparatus as set forth in claim 4 and further comprising means for limiting the pivotal movement of the platform.

7. Apparatus as set forth in claim 1 and further comprising means for limiting the pivotal movement of said platform.

8. Apparatus as set forth in claim 1 and further comprising means for limiting the axial movement of said base on the threaded shaft.

* * * * *